Patented Dec. 27, 1938

2,141,763

UNITED STATES PATENT OFFICE 2,141,763

PROCESS FOR RECOVERY OF COPPER FROM WASTE LIQUORS OF THE ARTIFICIAL SILK INDUSTRY

Adolf Richter, Dessau-in-Anhalt, Werner Busch, Leverkusen I. G. Werk, and Max Otto Schürmann, Dormagen, Germany, assignors to I. G. Farbenindustrie Aktiengesellschaft, Frankfort-on-the-Main, Germany No Drawing. Application November 11, 1936, Serial No. 110,314. In Germany November 23, 1935

2 Claims. (Cl. 23—147)

The present invention relates to a process for recovery of copper from waste liquors of the artificial silk industry and more particularly to such a process in which the ammoniacal and acid waste liquors containing copper, are worked-up in a combined process.

The waste liquors from the manufacture of cuprammonia silk contain considerable quantities of copper in a highly diluted state. Various methods have been proposed for recovering this copper. By expelling the ammonia from the spent precipitating baths a part of the copper is precipitated in the form of hydroxide which may be separated and returned to the manufacture. It has been proposed to recover the copper from the spent precipitating baths by adsorption in cellulose fibers, starch or other colloids. From the acid which has been used for removing the copper from the precipitated threads the copper has been deposited electrolytically or by cementation by means of iron. Also the copper in this acid liquor has been precipitated in the form of hydroxide by milk of lime.

The present invention relates to a process for working-up in common the spent cupriferous precipitation baths and the waste acid which has been used for removing the copper from the acids to obtain in a simple manner and practically quantitatively the copper in the form of copper hydroxide. According to the invention the alkaline precipitating bath and the acid solution of copper are mixed with each other in such proportion that the pH value of the mixture lies between 6 and 8, preferably 6.5 and 7.5. The mixture is run, preferably immediately, through a filter charged with sand or a similar filtering material on the surface of which the copper hydroxide flocculates and is retained. The flocculent precipitate is easily removed from the filter by a known method, for instance back-washing the filter or skimming by hand, and is used again for producing cuprammonia solution; or is worked up in some other manner, for instance, by dissolution in acid and cementation.

The advantages of the invention are manifold. Whereas hitherto the two waste solutions have been separately worked up and the copper either quantitatively or not has been recovered in a form contaminated by a precipitant, for instance, lime or iron used in cementation, the process of the invention treats both kinds of waste solution together in a single operation. The separation of the copper in the form of copper hydroxide is practically quantitative and the hydroxide is not contaminated with foreign matter. A special advantage of the immediate filtration is that no settling vats are necessary, which on the one hand occupy much space and from which on the other hand the settled precipitate must be discharged by means of pumps on to filters. Added to this it has been found that the removal of copper from the solutions by immediate filtration is more thorough than when intermediate settling vats are used.

The water which has been treated by the process of the invention may be discharged owing to the practically quantitative removal of the copper without fear of damaging any watercourse into which it may flow. Since the solutions leaving the filters have lost their corrosive properties the recovery of their sensible heat or the ammonium sulfate they contain offers no technical difficulty.

The following example illustrates the invention:

The spent precipitating bath having a content per liter of 0.145 gram of copper and 0.672 gram of ammonia and an acid which has been used for removing copper and containing per liter 7.90 grams of copper and 66.7 grams of sulfuric acid are mixed with each other in the proportion of 100 : 2.20 by allowing them to flow together. The mixture which has a pH value=7.2 is immediately run into a closed filter charged with sand of grain size 0.5 to 1 mm. On the surface of this filter the copper hydroxide is flocculated. The filtrate contains 0.004 to 0.005 gram of copper per liter. Thus the copper content in the two original cupriferous solutions has been separated in the form of copper hydroxide to the extent of over 98 per cent.

The copper hydroxide is from time to time removed from the filter by back-washing and returned in the form of a concentrated mud to the manufacture.

What we claim is:—

1. The process of recovering copper from waste liquors of the artificial silk industry in the form of copper hydroxide, which comprises mixing the spent cupriferous alkaline precipitating bath and the cupriferous acid washing liquid with each other in such a proportion that the mixture has a pH value between 6 and 8, running the mixture into a filter charged with sand, thus flocculating the copper hydroxide and removing it from the surface of the sand filter.

2. The process of recovering copper from waste liquors of the artificial silk industry in the form of copper hydroxide, which comprises mixing the spent cupriferous alkaline precipitating bath and the cupriferous acid washing liquid with each other in such a proportion that the mixture has a pH value between 6.5 to 7.5, running the mixture into a filter charged with sand, thus flocculating the copper hydroxide and removing it from the surface of the sand filter.

ADOLF RICHTER.
WERNER BUSCH.
MAX OTTO SCHÜRMANN.